US006089440A

United States Patent [19]

Brusha

[11] Patent Number: 6,089,440

[45] Date of Patent: Jul. 18, 2000

[54] ADJUSTABLE VEHICLE ASSEMBLY TOOL

[75] Inventor: Christie F. Brusha, Warren, Mich.

[73] Assignee: Chrysler Corporation, Auburn Hills, Mich.

[21] Appl. No.: 09/110,984

[22] Filed: Jul. 7, 1998

[51] Int. Cl.[7] .......................... B23K 37/00; B23K 31/02

[52] U.S. Cl. ....................... 228/44.3; 228/44.3; 228/182; 228/4.1; 269/55; 269/61

[58] Field of Search .................................. 228/44.3, 4.1, 228/6.1, 49.1, 182, 102; 29/430; 269/55, 61; 219/80

[56] References Cited

U.S. PATENT DOCUMENTS

| | | | |
|---|---|---|---|
| Re. 36,541 | 2/2000 | Rossi | 228/61 |
| 3,941,295 | 3/1976 | Medgebow et al. | 228/44.1 |
| 3,958,682 | 5/1976 | Martin | 198/19 |
| 4,063,075 | 12/1977 | Collom | 364/119 |
| 4,435,116 | 3/1984 | Van Deberg | 414/728 |
| 4,445,184 | 4/1984 | Noguchi | 364/513 |
| 4,573,626 | 3/1986 | Nishiyama | 228/6.1 |
| 4,635,839 | 1/1987 | Slavens | 228/29 |
| 4,698,483 | 10/1987 | Marinoni et al. | 219/121 LU |
| 4,709,133 | 11/1987 | Mainville | 219/125.1 |
| 4,736,515 | 4/1988 | Catena | 29/714 |
| 4,767,109 | 8/1988 | Raketich | 269/61 |
| 4,894,901 | 1/1990 | Soderberg | 29/428 |
| 4,905,884 | 3/1990 | Alborante et al. | 228/4.1 |
| 4,939,838 | 7/1990 | Gatta | 29/795 |
| 4,973,813 | 11/1990 | Mitchell | 219/109 |
| 4,973,817 | 11/1990 | Kanno et al. | 219/121.63 |
| 5,127,569 | 7/1992 | Sekine et al. | 228/6.1 |
| 5,141,093 | 8/1992 | Alexander | 198/345.1 |
| 5,174,488 | 12/1992 | Alborante | 228/4.1 |
| 5,265,317 | 11/1993 | Angel | 29/429 |
| 5,427,300 | 6/1995 | Quagline | 228/4.1 |
| 5,512,726 | 4/1996 | Arantes et al. | 219/125.1 |
| 5,836,068 | 11/1998 | Bullen et al. | 29/430 |

*Primary Examiner*—Patrick Ryan
*Assistant Examiner*—Lynne Edmondson

[57] ABSTRACT

A vehicle assembly tool includes a base and a frame pivotably coupled to the base. The frame is configured for holding a plurality of vehicle parts to be welded together. A motor is coupled to the frame via a gear system to move the frame relative to the base. Per the present disclosure, the base can be juxtaposed with a plurality of robotic welders, each having an end effector with six degrees of freedom, and the frame then moved relative to the base to essentially provide a seventh degree of freedom for welding the parts together. Also, the frame can be programmed to return, after welding, to one of several user-defined load positions, each of which load positions can be tailored to a respective individual for facilitating ergonomic loading of parts into the frame by the particular individual.

18 Claims, 3 Drawing Sheets

ADJUSTABLE VEHICLE ASSEMBLY TOOL

FIELD OF INVENTION

The present invention relates generally to vehicle assembly, and more particularly the tools for holding vehicle parts in work positions during assembly.

BACKGROUND OF THE INVENTION

Vehicle assembly lines typically include robotic welders for welding parts of vehicles together to effect assembly. Ordinarily, the parts to be welded are first loaded into a frame, referred to as a "tool", the position of which is translationally fixed. During loading, the parts are positioned and clamped in a predetermined orientation relative to each other. The parts are then spot welded together by the robotic welders. After spot welding, the clamps open, and the parts are extracted from the tool and moved to another location for finished welding.

To enable the robotic welders to weld parts together, end effectors having six degrees of freedom are associated with the welders. Consequently, the end effectors of the welders can move in accordance with a computer-controller program in six degrees of freedom, as required to undertake vehicle assembly.

While effective, such systems require several assembly lines, and the assembly lines generally require significant modifications and extended time during which production is halted to change the model of vehicle being assembled. The present invention recognizes, however, that the time and effort to undertake such so-called model change over can be reduced.

Moreover, assembly line workers are required to load the parts to be assembled into their respective frames, prior to processing by the robotic welders. It will be appreciated that a frame which can be conveniently and ergonomically loaded by one person, however, may not facilitate easy and ergonomic loading by another person. Unfortunately, existing fixed assembly frames do not provide for selectively establishing a load orientation that can be tailored to more than one person.

Accordingly, it is an object of the present invention to provide a vehicle assembly system which is adaptable to more than one model and versatile. Another object of the present invention is to provide a vehicle assembly system which can be used in conjunction with robotic welders having six degrees of freedom, to essentially establish a seventh degree of freedom. Still another object of the present invention is to provide a vehicle assembly system in which a plurality of user-selectable vehicle part loading positions can be established. Yet another object of the present invention is to provide a vehicle assembly system which is easy to use and cost-effective.

SUMMARY OF THE INVENTION

A tool is disclosed for holding a vehicle part in juxtaposition with at least one robotic welder having a plurality of degrees of freedom. The tool includes a base and a frame movably coupled to the base and configured for holding the vehicle part. Also, the tool includes a motor coupled to the frame for moving the frame relative to the base between a first orientation relative to the welder and a second orientation relative to the welder.

Preferably, the frame includes a plurality of clamps for engaging the part. In one preferred embodiment, the frame includes a bottom edge, and the frame is coupled to the base about an axis parallel to the bottom edge. In a particularly preferred embodiment, the axis is substantially collinear with the bottom edge, and the frame is pivotably coupled to the base. In an alternate embodiment, the axis is distanced from the bottom edge, and the frame is rotatably coupled to the base.

As envisioned by the present invention, a gear system couples the motor to the frame. Preferably, the gear system includes a frame gear associated with the frame and at least one reduction gear coupled to the motor and to the frame gear. Alternatively, the frame can be coupled to the motor via a flexible belt. Advantageously, the system includes a track for slideably supporting the base thereon.

In another aspect of the present invention, a vehicle assembly system includes at least one robotic welder including an end effector having a plurality of degrees of freedom. A base is positioned adjacent the welder, with a frame being movably engaged with the base for movement between first and second orientations relative to the welder. Moving means are coupled to the frame to move the frame relative to the base.

In still another aspect of the present invention, a method is disclosed for assembling a vehicle. The method of the present invention includes movably coupling a frame to a base, and then positioning a part in the frame. Next, the inventive method contemplates juxtaposing the base with a robotic welder having an effector movable in a plurality of degrees of freedom. The frame is then oriented at one or more of a selectable number of orientations relative to the welder.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
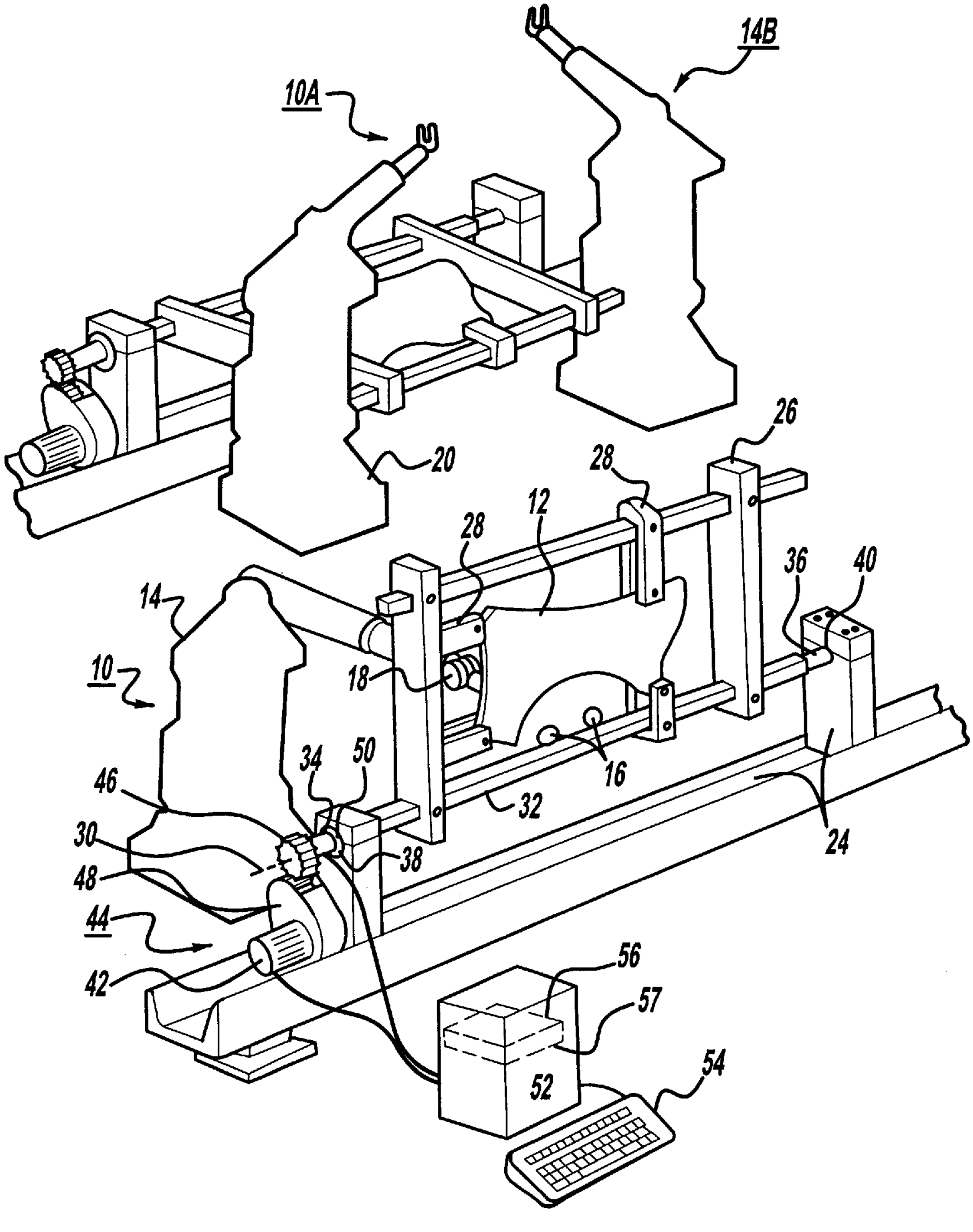
FIG. 1 is a perspective view of the vehicle assembly system of the present invention.

Referring initially to FIG. 1, a first system is shown and generally designated 10 for holding a vehicle part 12, such as a body quarter panel, in juxtaposition with a first plurality of robotic welders 14 to attach auxiliary parts 16 to the vehicle part 12. In one presently preferred embodiment, each robotic welder 14 includes an end effector 18 having six degrees of freedom. The welders 14 advantageously can be made by Comau of Italy.

As shown in FIG. 1, after welding by the first plurality of robotic welders 14, a transfer robot 20 can remove the vehicle part 12 from the first system 10 and position it in a second holding system 10A that is juxtaposed with a second plurality of the robotic welders 14B. It is to be understood that the second system 1 OA is substantially identical to the first system 10, and accordingly for clarity of disclosure the below discussion will focus on the first system 10. As disclosed more fully below, the vehicle part 12 is further processed by the welders 14 in the second plurality of welders 14B and then unloaded.

FIG. 1 shows that a track 22 is preferably disposed on the ground by the first plurality of welders 14. As shown, a metal base 24 is slideably or rollably engaged with the track 22. Accordingly, the metal base 24 can be moved past the welders 14 as appropriate for processing the vehicle part 12.

Additionally, a hollow metal frame 26 is movably engaged with the base 24. In accordance with principles well-known in the art, the frame 26 includes clamps 28 for holding the vehicle part 12 and the auxiliary parts 16.

It can be appreciated in reference to FIG. 1 that the frame 26 defines a long axis 30 that is generally parallel to the track 22 (and, hence, to the production line of the assembly system). Also, the frame 26 includes a lower edge 32 that is parallel to the axis 30. As shown in FIG. 1, two opposed pins 34, 36 protrude outwardly from the frame 26 at or just above the lower edge 32, and the pins 34, 36 are rotatably received in respective holes 38, 40 that are formed in the base 24. Accordingly, the frame 26 shown in FIG. 1 is pivotably engaged with the base 24 along the lower edge 32 of the frame 26.

A means is provided for moving the frame 26 relative to the base 24. In the embodiment shown in FIG. 1, the moving means is an alternating current (AC) servo-controlled motor 42. Alternatively, the moving means can be a direct current (DC) stepper motor (not shown) or a servo-controlled piston-and-cylinder actuator (not shown) that is connected to the base 24 and frame 26.

In the preferred embodiment shown, the motor 42 is mounted on the base 24 and is coupled to the frame 26 through a gear system, generally designated 44. Preferably, the gear system 44 includes a frame spur gear 46 that is attached to the frame 26. Per the present invention, the frame gear 46 is meshed with a reduction spur gear of a reduction gear assembly 48. In turn, the reduction gear assembly is coupled by means well-known in the art to the shaft of the motor 42.

Additionally, a position sensor is engaged with the frame 26 to sense the position of the frame 26 with respect to the base 24. In one preferred embodiment, the position sensor is a rheostat 50 that is mounted on the base 24 and engaged with one of the pins 34, 36 of the frame 26. In accordance with principles well-understood in the art, the rheostat 50 generates an electrical signal that is representative of the angular position of the pin 34/36 and, hence, that is representative of the orientation of the frame 26 with respect to the base 24.

It is to be appreciated in reference to FIG. 1 that both the rheostat 50 and motor 42 are electrically connected to a control console 52. In accordance with well-known principles, the control console 52 is any suitable robotic control console that can be programmed in accordance with the inventive steps below to activate the motor 42 to move the frame 26 relative to the base 24. In one presently preferred embodiment, the control console 52 is made by Comau of Italy. Accordingly, the control console 52 includes a data input device 54, such as an alpha-numeric keypad, and an electronic data processing and storage device 56, shown schematically in FIG. 1 in phantom. The data processing and storage device 56 implements a control module 57, as more fully disclosed below.

Figure 2:
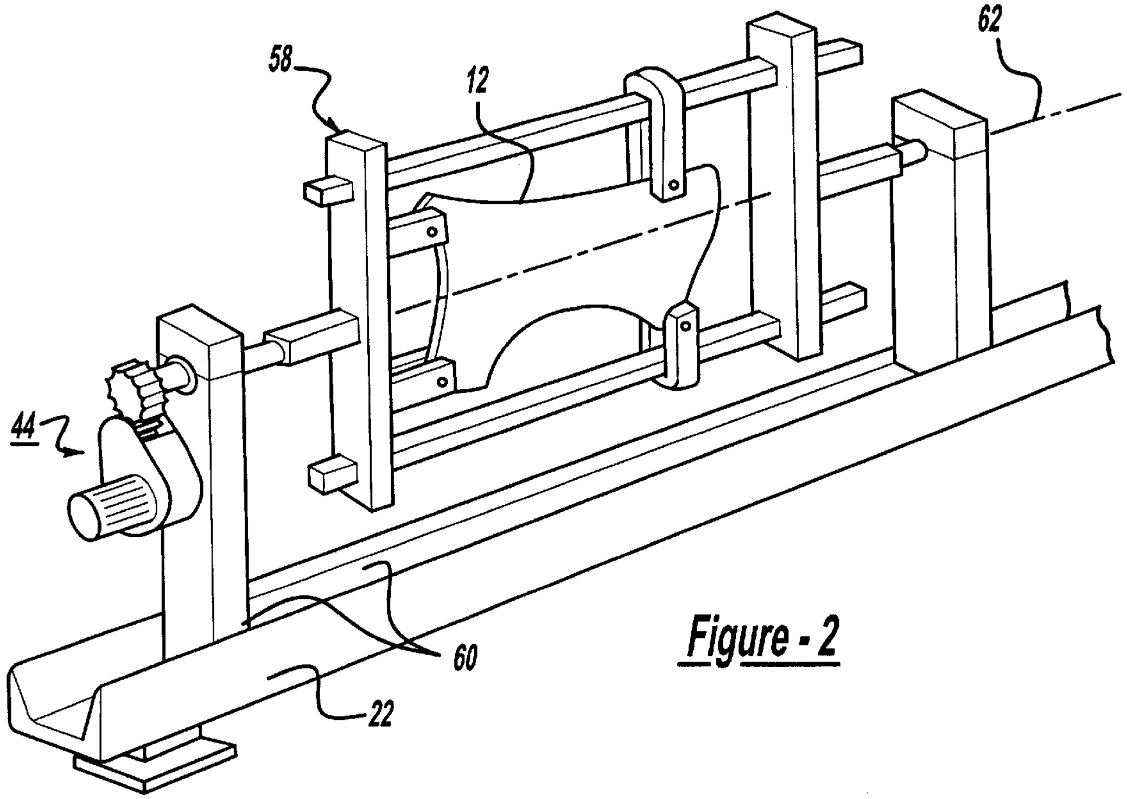
FIG. 2 is a perspective view of an alternate embodiment of the assembly system, showing the frame rotatably engaged with the base about the long axis of the frame.
Figure 3:
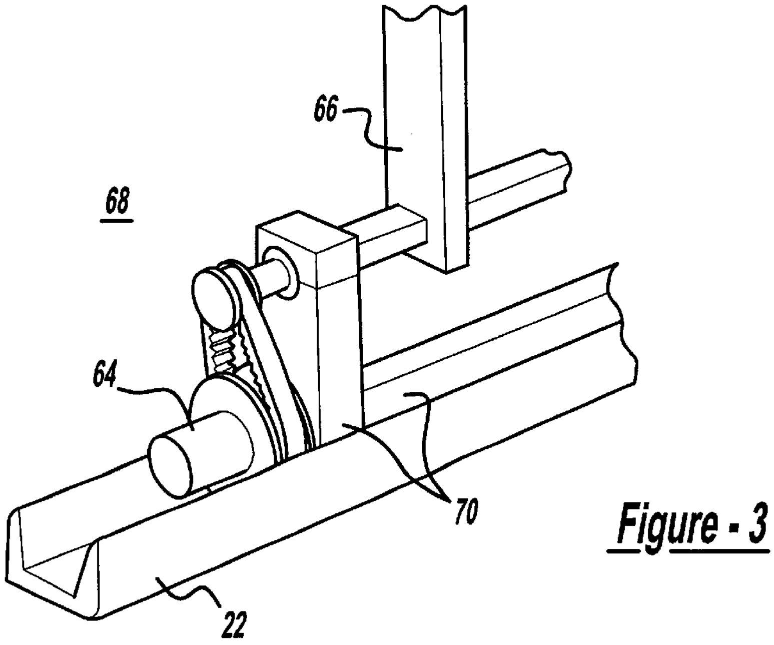
FIG. 3 is a perspective view of still another embodiment, showing the motor coupled to the frame by means of a drive belt.

FIGS. 2 and 3 show alternate frame-base combinations. For example, FIG. 2 shows that a frame 58 can be rotatably coupled to a base 60 about a central long axis 62 of the frame 58. As another alternative, FIG. 3 shows that a motor 64 can be coupled to a frame 66 via a toothed belt system, generally designated 68, for moving the frame 66 relative to a base 70.

Figure 4:
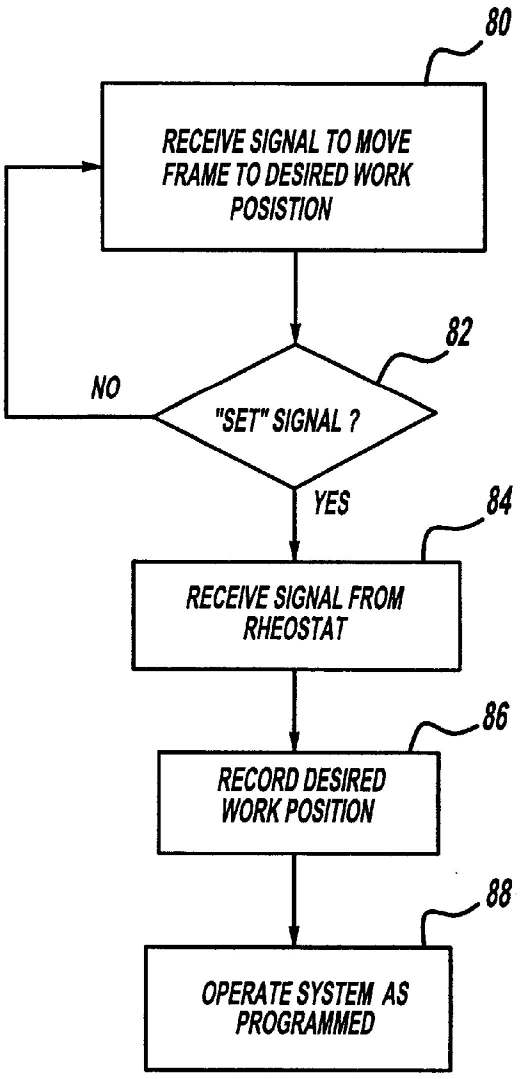
FIG. 4 is a flow chart showing the programmable load position steps of the present invention.
Figure 5:
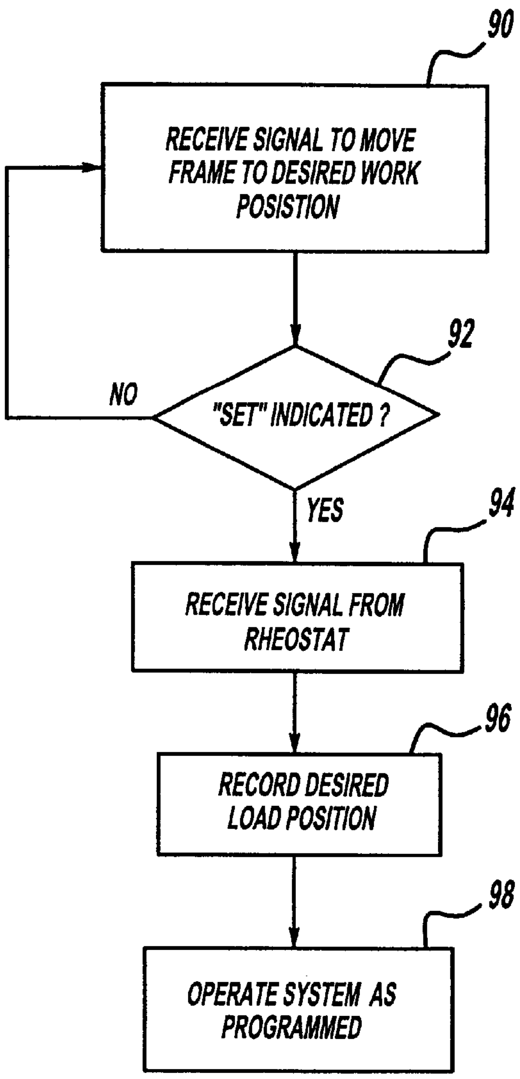
FIG. 5 is a flow chart showing the programmable work position steps of the present invention.

Now referring to FIGS. 4 and 5, the inventive computing steps of the present invention for establishing preselected load and work orientations of the frame 26 with respect to the base 24 can be seen. FIGS. 4 and 5 illustrate the structure of the control module 57 of the present invention as embodied in computer program software. Those skilled in the art will appreciate that the Figures illustrate the structures of computer program code elements that function according to this invention. Manifestly, the invention is practiced in one essential embodiment by a machine component that renders the computer program code elements in a form that instructs a digital processing apparatus (that is, a computer) to perform a sequence of operational steps corresponding to those shown in the Figures.

These instructions may reside on a program storage device including a data storage medium, such as a computer diskette. Alternatively, such media can also be found in semiconductor devices, on magnetic tape, on optical disks, on a DASD array, on a conventional hard disk drive, on electronic read-only memory or on electronic ransom access memory, or other appropriate data storage device. In an illustrative embodiment of the invention, the computer-executable instructions may be lines of compiled machine language code or $C^{++}$ language code.

It is to be understood that the present invention can be implemented by logic circuits in the data processing and storage device 56. As yet another alternative, the present invention can be implemented by a circuit board (not shown), and the operative components of the control module 28 accordingly would be electronic components on the circuit board.

Referring in detail to FIG. 4, at block 80 the control module 57 receives an operator-generated signal to move the frame 26 to a desired load position. This signal can be generated by the operator by, e.g., appropriately manipulating the input device 54 (FIG. 1) to incrementally change the orientation of the frame 26 relative to the base 24 by incrementally moving the motor 42.

At decision diamond 82, the control module 57 determines whether the present orientation of the frame 26 has been "set" by the operator to be the desired load position. To indicate the desire to set the load position, the operator can generate a "set" signal by appropriately manipulating the input device 54. For example, the operator can depress an "ENTER" key on the device 54 when the device 54 is a keypad as shown, to thereby generate the "set" signal. Or, if the device is a mouse, the operator can generate the "set" signal by clicking the mouse.

In any case, if no "set" signal has been generated the control module 57 loops back to block 80, but otherwise the control module 57 proceeds to block 84. At block 84, the control module 57 receives a position signal from the rheostat 50 (FIG. 1). Then, at block 86, the control module 57 records the orientation of the frame 26, as indicated by the position signal, as the desired load position. At block 88, the control module 57 operates the system 10 as programmed.

In other words, after establishing and recording a preselected load orientation of the frame 26 which is preferably tailored to the particular operator, the control module causes the system 10 to move from the load position, wherein the operator conveniently loads parts to be processed into the frame 26, to various work positions, wherein the frame 26 moves as appropriate to facilitate processing of the parts. It is to be understood that the control module 57 can establish and store a plurality of load positions, each of which is tailored to a particular operator to thereby facilitate ergonomic loading of parts into the frame 26.

FIG. 5 shows that in addition to establishing one or more operator-tailored load positions, the control module 57 can be programmed to establish a plurality of work positions of the frame 26. Thereby, the versatility of the system 10 is enhanced, rendering it comparatively adaptable to changes in the production line. Stated differently, by programming the system 10 with one or more work positions, the six degrees of freedom afforded by conventional robotic welders is augmented by what is effectively a seventh degree of freedom.

Referring in detail to FIG. 5, at block 90 the control module 57 receives an operator-generated signal to move the frame 26 to a desired work position. This signal can be generated by the operator by, e.g., appropriately manipulating the input device 54 (FIG. 1) to incrementally change the orientation of the frame 26 relative to the base 24 by incrementally moving the motor 42.

At decision diamond 92, the control module 57 determines whether the present orientation of the frame 26 has been "set" by the operator to be the desired work position. To indicate the desire to set the work position, the operator can generate a "set" signal by appropriately manipulating the input device 54. For example, the operator can depress an "ENTER" key on the device 54 when the device 54 is a keypad as shown, to thereby generate the "set" signal. Or, if the device is a mouse, the operator can generate the "set" signal by clicking the mouse.

In any case, if no "set" signal has been generated the control module 57 loops back to block 90, but otherwise the control module 57 proceeds to block 94. At block 94, the control module 57 receives a position signal from the rheostat 50 (FIG. 1). Then, at block 96, the control module 57 records the orientation of the frame 26, as indicated by the position signal, as the desired work position. At block 98, the control module 57 operates the system 10 as programmed.

In other words, after establishing and recording a preselected work orientation of the frame 26, the control module causes the system 10 to move to the predetermined work position or positions that is/are appropriate for the particular vehicle model and production stage. It is to be understood that the control module 57 can establish and store a plurality of work positions, each of which is tailored to a particular step in vehicle assembly to thereby enhance the versatility of the system 10.

While the particular ADJUSTABLE VEHICLE ASSEMBLY TOOL herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A tool for holding a vehicle part in juxtaposition with at least one robotic welder having a plurality of degrees of freedom, comprising:

a base;

a frame movably coupled to the base and configured for holding the vehicle part; and a motor couple e frame for moving the frame with the held vehicle part relative to the base between a first orientation relative to the welder and a second orientation relative to the welder.

2. The tool of claim 1, wherein the frame includes a plurality of clamps for engaging the part.

3. The tool of claim 2, wherein the frame includes a bottom edge, and the frame is coupled to the base about an axis parallel to the bottom edge.

4. The tool of claim 3, wherein the axis is substantially collinear with the bottom edge, and the frame is pivotably coupled to the base.

5. The tool of claim 3, wherein the axis is distanced from the bottom edge, and the frame is rotatably coupled to the base.

6. The tool of claim 3, further comprising a gear system for intercoupling the motor and the frame.

7. The tool of claim 6, wherein the gear system includes a frame gear associated with the frame and at least one reduction gear coupled to the motor and to the frame gear.

8. The tool of claim 3, further comprising at least one flexible belt for intercoupling the frame and motor.

9. The tool of claim 4, further comprising a track for slideably supporting the base thereon.

10. A vehicle assembly system, comprising:

at least one robotic welder including an end effector having a plurality of degrees of freedom;

a base positioned adjacent the welder;

a frame movably engaged with the base for movement between first and second orientations relative to the welder; and moving means coupled to the frame to move the frame relative to the base.

11. The system of claim 10, wherein the moving means includes an electric motor and a gear system intercoupling the motor and frame.

12. The system of claim 11, wherein the frame includes a bottom edge, and the frame is coupled to the base about an axis parallel to and collinear with the bottom edge, such that the frame is pivotably coupled to the base.

13. The system of claim 12, wherein the gear system includes a frame gear associated with the frame and at least one reduction gear coupled to the motor and to the frame gear.

14. The system of claim 10, wherein the moving means includes a motor and at least one flexible belt for intercoupling the frame and motor.

15. The system of claim 13, further comprising a track for slideably supporting the base thereon.

16. A method of assembling the vehicle, comprising the steps of:

movably coupling a frame to a base;

positioning a part in the frame;

juxtaposing the base with a robotic welder having an effector movable in a plurality of degrees of freedom; and orienting the frame with the held vehicle part at one or more of a selectable number of orientations relative to the welder.

17. The method of claim 16, further comprising moving the base translationally relative to the welder along a track.

18. The method of claim 16, wherein the orienting step is accomplished by pivoting the frame relative to the base.

* * * * *